United States Patent Office 3,281,383
Patented Oct. 25, 1966

1

3,281,383
BRANCHED POLYMERS PREPARED FROM MONO-LITHIUM-TERMINATED POLYMERS AND COMPOUNDS HAVING AT LEAST THREE REACTIVE SITES
Robert P. Zelinski and Henry L. Hsieh, Bartlesville, Okla., assignors to Phillips Petroleum Company, a corporation of Delaware
No Drawing. Filed Aug. 9, 1962, Ser. No. 215,773
The portion of the term of the patent subsequent to Feb. 19, 1980, has been disclaimed and dedicated to the Public
19 Claims. (Cl. 260—23.7)

This application is a continuation-in-part of our copending application Serial No. 828,058, filed July 20, 1959, now U.S. Patent 3,078,254, February 19, 1963.

This invention relates to a method of preparing polymers having long chain branches. In another aspect, it relates to branched polymers having improved resistance to cold flow.

Many types of organometallic compounds are known polymerization initiators, especially for the production of polymers from conjugated dienes alone or with copolymerizable vinylidene-containing monomers. Normally the polymerization conditions can be adjusted to produce polymers over a broad range of viscosities. The polymers which have relatively high Mooney values are, however, frequently difficult to process. When polymers of lower Mooney values are produced in order to improve their processability, such polymers have a tendency to cold flow in the uncured state. This is particularly true for the conjugated diene polymers such as polybutadiene, polyisoprene and the like. Such polymers will commonly have a cold flow problem when their Mooney value is below 30 (ML–4 at 212° F.).

We have found that polymers of conjugated dienes and other vinylidene-containing monomers can be prepared so that they exhibit very little, if any, tendency to undergo cold flow and yet have better processing properties than polymers of comparable Mooney values prepared by prior art methods. These advantages are realized with no sacrifice in the physical properties of the ymers of this type in our above-mentioned copending vulcanizates. We disclosed a method of preparing polapplication. In this application, we described the production of polymers from vinylidene-containing monomers in the presence of an organolithium initiator, in one aspect, an organo-monolithium initiator, to produce polymers having terminal lithium atoms. We further pointed out that if the polymer chain has only one carbon-lithium bond, these polymers can be reacted with compounds containing three active halogen atoms to produce a polymer having a Y shape. According to our invention polymers having good processability but very little, if any, cold flow, can be produced in this manner. Broadly, in our invention a branched polymer is prepared by polymerizing conjugated dienes or vinylidene-substituted aromatic compounds in the presence of an organo-monolithium initiator to produce polymer which contains an active lithium atom on one end of the polymer chain. This lithium terminated polymer is then reacted with a compound which has at least three reactive sites capable of reacting with the carbon-lithium bond and adding to the carbon possessing this bond in the polymer. The result is a polymer having relatively long branches which radiate from a nucleus formed by the polyfunctional compound which reacted with the lithium terminated polymer. For convenience, we refer to these polymers as "radial" polymers.

It is an object of our invention to provide a method of making a polymer having long chain branches. Another

2 object of our invention is to provide a method of making "radial" polymers. Still another object is to provide a method of making a conjugated diene polymer using an organometallic initiator in such a way that the polymer has very little or no tendency to cold flow. Still another object is to provide an improved polymer which is readily processable but has very little tendency to cold flow in the uncured state. Other objects, advantages and features of our invention will be apparent to those skilled in the art from the following discussion.

Monomers which can be used to prepare the polymers of our invention should be hydrocarbons such as conjugated dienes or vinyl-substituted aromatic compounds. The conjugated dienes ordinarily contain from 4 to 12 carbon atoms per molecule and those containing from 4 to 8 carbon atoms are preferred. Examples of such compounds include 1,3-butadiene, isoprene, 2,3-dimethyl-1,3-butadiene, piperylene, 3-buty-1,3-octadiene, phenyl-1, 3-butadiene and the like. The vinyl-substituted aromatic compounds include styrene, 1-vinylnaphthalene, 2-vinylnaphthalene and the alkyl, cycloalkyl, aryl, alkaryl, and arakyl derivatives thereof in which the total number of carbon atoms in the combined substituents is generally not greater than 12. Examples of such substituted monomers include 3-methylstyrene, 4-n-propylstyrene, 4-cyclohexylstyrene, 4-dodecylstyrene, 2-ethyl-4-benzylstyrene 4-p-tolylstyrene, 4-(4-phenyl-n-butyl) styrene, and the like. The conjugated dienes and the vinyl-substituted aromatic compounds can be polymerized alone or in admixture to form homopolymers, copolymers or block copolymers. Monomers which are preferred for the pactice of our invention are butadiene, isoprene and styrene. The preferred polymers are those in which the conjugated dienes are present in a major amount.

The polymers are prepared by contacting the monomer or monomers with an organo-monolithium compound. The preferred class of these compounds can be represented by the formula RLi wherein R is a hydrocarbon radical selected from the group consisting of aliphatic, cycloaliphatic, and aromatic radicals containing from 1 to 20 carbon atoms, although higher molecular weight initiators can be used. Examples of these initiators include methyllithium, n-butyllithium, n-decyllithium, phenyllithium, naphthyllithium, p-tolyllithium, cyclohexyllithium, eicosyllithium, and the like.

The amount of initiator used varies depending upon the desired molecular weight of the end product. We prefer to conduct the polymerization so that the polymer formed has a relatively low Mooney value, for example less than 30. Polymers ranging from these relatively low Mooney rubbers to liquids can be obtained if desired by appropriate adjustment of the initiator level. Liquid polymers having molecular weight in the range of 1000 up to about 20,000 can readily be prepared, ordinarily by using initiator levels in the range of about 5 to 100 millimoles per 100 grams of monomer (mhm.). Levels of initiator below this range, e.g. 0.25 mhm. or less, can be used to produce semisolid to solid polymers of high molecular weight. The initiator level for our invention is commonly in the range between 1 and 40 millimoles per 100 grams of monomers.

The polymerization is normally carried out at a temperature in the range between −100 and +150° C., preferably between −75 and +75° C. A diluent can be used such as the hydrocarbons illustrated by benzene, toluene, cyclohexane, isooctane and the like. These diluents are normally paraffins, cycloparaffins, or aromatics containing from 4 to 10 carbon atoms per molecule. The resulting polymer contains a very high percentage of molecules in which a lithium atom is positioned at one end, although any impurities present, such as water or alcohol, will tend to reduce the amount of lithium terminated polymer formed.

At the conclusion of the polymerization, the polyfunctional treating agent which contains at least three reactive sites is added to the unquenched reaction mixture. This agent must be added before any material such as water, acid or alcohol is added to inactivate and/or remove the lithium atoms present in the polymer. The temperature of this reaction can vary over a broad range and is conveniently used for the polymerization. Ordinarily the higher temperatures are preferred for this reaction for example, from room temperature up to 250° F. and above. Temperatures above 100° F. are preferred for rapid reaction. Under such conditions, the reaction normally occurs as soon as the materials are blended and the time is quite short, for example, in the range of 1 minute to 1 hour. Longer reaction periods are required at the lower temperatures.

The polyfunctional reagent which is reacted with the lithuim terminated polymer must contain at least three reactive sites which are capable of reacting with the lithium-carbon bond in the polymer and thereby coupling the reagent to the polymer at this bond. For this reason, compounds containing active hydrogen atoms such as water, alcohol, acids and the like are to be avoided since such compounds replace the lithium atom with hydrogen and do not effect the desired coupling. It should be understood, however, that compounds containing relatively small amounts of active hydrogen can be used provided the reactive sites capable of producing couplings are present in sufficient quantity to offset the effect of inactivation produced by the active hydrogens. Types of treating agents which can be used include the polyepoxides, polyisocyanates, polyimines, polyaldehydes, polyketones, polyanhydrides, polyesters, polyhalides and the like. These compounds can contain two or more types of functional groups such as the combination of epoxy and aldehyde groups or isocyanate and halide groups.

While any polyepoxide can be used, we prefer those which are liquid since they can be readily handled and form a relatively small nucleus for the radial polymer. Especially preferred among the polyepoxides are the epoxidized hydrocarbon polymers such as epoxidized liquid polybutadiene and the epoxidized vegetable oils such as epoxidized soybean oil and epoxidized linseed oil. Other epoxy compounds such as 1,2,5,6,9,10-triepoxydecane, and the like can also be used.

The polyisocyanates are preferably those compounds represented by the formula $R(NCO)_m$ where R is a polyvalent organic radical which can be aliphatic, cycloaliphatic, or aromatic and contains from 2 to 30 carbon atoms and $m$ is an integer of 3 or more, preferably 3 or 4. Examples of such compounds include benzene-1,2,4-triisocyanate, naphthalene-1,2,5,7-tetraisocyanate, triphenylmethane-triisocyanate, naphthalene-1,3,7-triisocyanate, and the like. Especially suitable is a commercially available product known as PAPI-1. This material is a polyarylpolyisocyanate having an average of 3 isocyanate groups per molecule and an average molecular weight of about 380. Structurally the compound can be represented by a series of isocyanate-substituted benzene rings joined through methylene linkages.

The polyimines which are also known as polyaziridinyl compounds are preferably those containing 3 or more aziridine rings as represented by the formula:

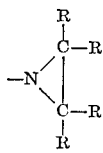

wherein each R can be hydrogen, alkyl, aryl or cycloalkyl radicals or composites of these hydrocarbon radicals, the total of the R groups containing up to 20 carbon atoms. The aziridine rings can be attached to a carbon, phosphorous or sulfur atom. Examples of these compounds are the triaziridinyl phosphine oxides or sulfides such as tri(1-aziridinyl)phosphine oxide, tri(2-methyl-1-aziridinyl) phosphine oxide, tri(2-ethyl-3-decyl-1-aziridimyl) phosphine sulfide, tri(2-phenyl-1-aziridinyl)phosphine oxide, tri(2-methyl-3-cyclohexyl-1-aziridinyl)phosphine sulfide, and the like. Also suitable are the triaziridinyl substituted triazines and the triphosphatriazines containing 3, 4, 5 or 6 aziridinyl substituted rings. Examples of these compounds include 2,4,6-tri(aziridinyl)1,3,5-triazine, 2,4,6-tri(2-methyl-1-aziridinyl)1,3,5-triazine, 2,4,6-tri(1-aziridimyl)-2,4,6-triphospha-1,3,5-triazine, 2,4,6-tri-(2 - methyl - n - butyl-aziridinyl)2,4,6-triphospha-1,3,5-triazine and the like.

The polyaldehydes are represented by compounds such as 1,4,7-naphthalene tricarboxyaldehyde, 1,7,9-anthracene tricarboxyaldehyde, 1,1,5-pentane tricarboxyaldehyde and similar polyaldehyde-containing aliphatic and aromatic compounds. The polyketones can be represented by compounds such as 1,6-hexandial-3-one, 1,4,9,10-anthracenetetrone, 2,3-diacetonylcyclohexanone, and the like. Examples of the polyanhydrides include pyromellitic dianhydride, styrene-maleic anhydride copolymer, and the like. Examples of the polyesters are the glycerol tristearates, glycerol trioleates and similar compounds.

Among the polyhalides, we prefer the silicon tetrahalides such as silicon tetrachloride, silicon tetrabromide and silicon tetraiodide and the trihalosilanes such as trifluorosilane, trichlorosilane, trichloroethylsilane, tribromobenzylsilane, and the like. Also preferred are the polyhalogen substituted hydrocarbons such as 1,3,5-tri(bromoethyl)benzene, 2,5,6,9 - tetrachloro-3-7-decadiene, and the like, in which the halogen is attached to a carbon atom which is alpha to an activating group such as an ether linkage, a carbonyl group, or a carbon-to-carbon double bond. Substituents which are inert with respect to lithium atoms in the terminally reactive polymer can also be present in the active halogen containing compounds. Alternatively, other suitable reactive groups different from the halogen as described above can be present. Examples of compounds containing more than one type of functional group include 1,3-dichloro-2-propanone, 2,2-dibromo-3-decanone, 3,5,5-trifluoro-4-octanone, 2,4 - dibromo-3-pentanone, 1,2,4,5-diepoxy-3-pentanone, 1,2,4,5 - diepoxy-3-hexanone, 1,2,11,12-diepoxy-8-pentadecanone, 1,3,18,19-diepoxy-7,14-eicosanedione, and the like.

It can be seen from the above description of suitable polyfunctional compounds that a vast number of possible reagents are available. In general the compounds are organic or, in the case of the silicon halides, have a silicon base. They are liquids and/or have relatively low molecular weights for example, less than 2,000. Also the compounds are relatively free of other reactive groups which would compete with the groups named above for reaction with the lithium-carbon bond.

Generally the amount of polyfunctional treating agent used is in the range of 0.1 to 1.5 equivalents of treating agent based upon the lithium present in the polymer. One equivalent of treating agent is the optimum amount for maximum branching. Larger amounts encourage the production of polymers containing terminally reactive groups or coupling instead of branching. When equivalent amounts of treating agent and lithium-containing polymer are employed, the final product comprises a branched polymer in which the polymer chain is joined at one end to each reactive site of the treating agent. When the amount of polyfunctional agent is insufficient to react with all of the lithium-containing polymer chains, the final product will be a blend of comparatively low molecular weight linear polymer with the higher molecular weight radial polymer. While the reaction of the lithium-terminated polymer with the polyfunctional treating agent increases the inherent viscosity and Mooney value of the polymer and drastically reduces its tendency to cold flow, the process does not involve crosslinking and the product is readily processable.

As a variation of the invention, the lithium-terminated polymer can be prepared so that if directly recovered, it would have a Mooney value higher than 30, for example, 50 or even higher. This composition is then blended with a branched polymer obtained by treatment of the unquenched polymerization mixture with the polyfunctional treating agent. Such a blend can be made by treating the lithium terminated polymer polymerized to a relatively high Mooney with an insufficient amount of polyfunctional treating agent so that only a portion of the polymer chains react.

After the polymers have been reacted with the polyfunctional compound, they are recovered by treatment with materials containing active hydrogen, such as alcohol or acid or aqueous solutions or mixtures of alcohol and acids or similar reagents. This is a conventional method of recovering polymer from organometal polymerization mixtures.

Properties of the final product can be varied considerably by varying the molecular weight of the starting material and the type and amount of polyfunctional treating agents. The product containing long branches prepared in this manner can be blended with other types of polymers to get compositions with improved properties. For example, the long chain branched polymers of this invention can be blended with an essentially linear cis-polybutadiene to reduce the cold flow of the latter. The improvements in cold flow are obtained with very small amounts of the treating agent. The amounts used expressed as parts per one hundred parts polymer is usually small. The amount expressed in this manner, of course, depends upon the particular treating agent used but generally it is less than 1 part by weight per 100 parts of polymer and frequently as little as 0.5 part by weight or less of polyfunctional treating agent is sufficient to accomplish the desired result. Polymers ranging from liquid to very low Mooney rubber can be transformed into rubber with very little if any cold flow but having good processing and vulcanized properties. Block copolymers, such as are obtained with butadiene and styrene, have unusually high green tensile strength when produced by this process. Because of the marked reduction in cold flow of these polymers, it is possible to incorporate oils as is done in SBR rubber to obtain a lower cost elastomer with good physical properties. Oil extended radial polybutadiene exhibits negligible cold flow and good processing character.

In order to illustrate further the advantages of our invention, the following examples are presented. The conditions and proportions given therein are typical only and should not be construed to limit our invention unduly.

*Example I*

Polybutadiene and two block copolymers of butadiene and styrene were prepared in accordance with the following recipe:

| | |
|---|---|
| 1,3-butadiene, parts by weight | Variable |
| Styrene, parts by weight | Variable |
| Toluene, parts by weight | 1000 |
| n-Butyllithium, mhm.[1] | 4.4 |
| Temperature, °F. | 122 |
| Time, hours | 3 |
| Conversion, percent | 100 |

[1] Millimoles per 100 parts monomers.

Toluene was charged first, the reactor was purged with nitrogen, the monomeric material was added, and then the butyllithium. Polybutadiene was prepared in the first run and butadiene/styrene block copolymers were prepared in the second and third runs. In Run 2, butadiene was polymerized first and styrene was then added and allowed to polymerize. The reverse procedure was used in Run 3 with styrene being polymerized first and then the butadiene. After a three-hour reaction period, a portion of each mixture was removed for use as a control and the reaction was terminated with isopropyl alcohol after which the polymer was coagulated with isopropyl alcohol. The remainder of each mixture was treated with an equivalent amount, based on the initiator, of a commercially available liquid epoxidized polybutadiene (Oxiron 2000). The amount used was 0.8 gram per 100 grams monomer, or monomers, charged. The epoxidized polybutadiene was added at 122° F., the reactants were agitated, and the polymers coagulated with isopropyl alcohol. A reaction occurred immediately upon contact of the epoxidized polybutadiene with the lithium-containing polymers. All polymers were separated, 0.5 part by weight per 100 parts polymer of the antioxidant 2,2′-methylene-bis(4-methyl-6-tert-butylphenol) was added, and the products were dried.

The liquid epoxidized polybutadiene used in this example is characterized as a pale amber liquid having a viscosity of 1800 poises at 25° C., a specific gravity of 1.010, and an aliphatic hydrocarbon chain as a backbone to which is attached a multiplicity of epoxy groups, the epoxy content being 9.0 percent (oxirane oxygen). The epoxy equivalent (number of grams of resin containing 1 gram mole of epoxide) is 177.

The following table shows inherent viscosity of each of the polymers before and after treatment with epoxidized polybutadiene. All products were gel free.

| Run No. | Bd/S, Wt. Ratio | Inherent Viscosity | |
|---|---|---|---|
| | | Control | Treated Polymer |
| 1 | 100/0 | 0.41 | 0.80 |
| 2 | 70/30 | 0.41 | 0.72 |
| 3 | 70/30 | 0.47 | 0.73 |

The data show a marked increase in inherent viscosity in all the runs. The control samples were all semi-liquids. The treated samples were solids. Tensile test specimens were prepared from the treated polymer from Run 3. The green tensile, elongation, and modulus values were as follows:

| | |
|---|---|
| Tensile, p.s.i | 1315 |
| Elongation, percent | 765 |
| 300% modulus, p.s.i. | 430 |

*Example II*

Butadiene was polymerized in two runs using n-butyllithium as the initiator. The following recipes were used:

| | Run 1 | Run 2 |
|---|---|---|
| 1,3-butadiene, parts by weight | 100 | 100 |
| Cyclohexane, parts by weight | 780 | |
| Toluene, parts by weight | | 1,000 |
| n-Butyllithium, mmoles | 1.6 | 0.6 |
| Temperature, °F | 122 | 122 |
| Time, hours | 3 | 3 |
| Conversion, percent | 100 | 100 |

The polymerization procedure was the same as in Example I. After a 3-hour reaction period, a portion of the mixture from the first run was removed for use as a control and the reaction was terminated with isopropyl alcohol. The total reaction mixture from Run 2 was terminated with isopropyl alcohol. The remainder of the first run was treated at 122° F. with the epoxidized polybutadiene described in Example I. The products were coagulated with isopropyl alcohol and the antioxidant, 2,2′ - methylene-bis(4 - methyl - 6-tert - butylphenol), was added to both samples as in Example I. Results of inherent viscosity, Mooney, and cold flow determinations on the control and treated polymers are shown in the following table:

|  | Run 1 | | Run 2, Control |
|---|---|---|---|
|  | Control | Treated |  |
| Oxiron 2000 [1] | | [3] 2 | |
| Inherent viscosity | 1.20 | 1.89 | 2.21 |
| ML-4 at 212° F. | ([2]) | 38.2 | 35.2 |
| Cold flow, mg./min. | | 0.9 | 13.4 |

[1] Milliequivalents per 100 grams monomer.
[2] Too low to measure.
[3] 0.35 gram per 100 grams monomer or 1.25 equivalents, based on initiator.

The data show that in Run 1 the treated polymer had a higher inherent viscosity and higher Mooney than the untreated polymer. The treated polymer from Run 1 and control polymer from Run 2 had similar Mooney values. While the treated polymer had a lower inherent viscosity than the control, the cold flow was negligible whereas the cold flow of the control polymer was high.

The treated polymer from Run 1 and a commercial polybutadiene prepared with an organolithium initiator, were compounded and cured and physical properties determined. The compounding recipe, raw properties and processing properties are shown in the following tables:

COMPOUNDING RECIPE, PARTS BY WEIGHT

| Polymer | 100 |
|---|---|
| High abrasion furnace black | 50 |
| Zinc oxide | 3 |
| Stearic acid | 1 |
| Flexamine [1] | 1 |
| Resin 731D [2] | 5 |
| Philrich 5 [3] | 5 |
| Sulfur | 1.75 |
| MOBS Special [4] | 1.1 |

[1] Physical mixture containing 65 percent of a complex diarylamine-ketone reaction product and 35 percent of N,N′-diphenyl-p-phenylenediamine.
[2] Disproportionated pale rosin stable to heat and light.
[3] Aromatic oil.
[4] N-oxydiethylene-2-benzothiazyl sulfenamide.

RAW POLYMER PROPERTIES

|  | Run 1 | Commercial |
|---|---|---|
| ML-4 at 212° F. | 38.2 | 35.0 |
| Cold flow, mg./min. | 0.9 | 10.0 |

PROCESSING PROPERTIES

|  | | |
|---|---|---|
| MS-1½ at 212° F. | 38.5 | 47.5 |
| Mill handling | Good | Poor |
| Extrusion at 250° F.: | | |
| Inches/minute | 57.5 | 59.8 |
| Grams/minute | 101.0 | 107.0 |
| Rating (Garvey Die) | 12 | 7+ |

Both compositions when cured 30 minutes at 307° F. exhibited good physical properties, both before and after oven aging 24 hours at 212° F.

These data show that the polymer treated with epoxidized polybutadiene had very little cold flow and the mill handling characteristics and extrusion rating were better than the commercial polybutadiene. The commercial sample and the treated polymer had similar raw Mooney values.

*Example III*

The following recipe was used for the polymerization of isoprene:

| Isoprene, parts by weight | 100 |
|---|---|
| Cyclohexane, parts by weight | 1000 |
| n-Butyllithium, mhm. | 1.0 |
| Temperature, ° F. | 122 |
| Time, hours | 3 |
| Conversion, percent | 100 |

The procedure of Example I was followed with a portion of the reaction mixture being withdrawn and coagulated with isopropyl alcohol after three hours. The remainder was treated at 122° F. with 1.4 milliequivalents (0.25 gram) per 100 grams monomer of the epoxidized polybutadiene described in Example I. The following results were obtained:

|  | Inh. Visc. | Gel, percent | ML-4 at 212° F. | Cold Flow, mg./min. |
|---|---|---|---|---|
| Untreated polymer | 1.93 | 0 | 24 | 26.6 |
| Treated polymer | 2.93 | 0 | 56 | 0.5 |

These data show the great reduction in cold flow when the polyisoprene was treated with epoxidized polybutadiene.

*Example IV*

A series of runs was made for the production of block copolymers of styrene and butadiene using variable monomer ratios. The diluent was 860 phr. toluene, the polymerization temperature was 122° F. and 3 mhm. of n-butyllithium was used as the initiator. Styrene was charged first and allowed to polymerize 30 minutes. Butadiene was added and the reaction continued for 2.5 more hours, or a total reaction period of three hours. Conversion in all runs was 100 percent. The procedure given in the preceding examples was followed with a portion of each mixture being removed for use as a control and terminated with isopropyl alcohol. The remainder was treated at 122° F. with liquid epoxidized polybutadiene as in Example I using 3 milliequivalents (0.53 gram) per 100 grams monomers (one equivalent based on initiator). Inherent viscosities were determined on both control and treated polymers. All products were gel free. Green tensile and elongation were determined on the treated polymers. Results are summarized in the following table:

| Run No. | Styrene/Butadiene, Wt. Ratio | Inh. Visc. | Green Properties | |
|---|---|---|---|---|
|  |  |  | Tensile, p.s.i. | Elong., percent |
| 1 (Control) | 10/90 | 0.82 |  |  |
| 1 (Treated) | 10/90 | 1.41 | 50 | 810 |
| 2 (Control) | 25/75 | 0.75 |  |  |
| 2 (Treated) | 25/75 | 1.24 | 3,340 | 1,015 |
| 3 (Control) | 40/60 | 0.78 |  |  |
| 3 (Treated) | 40/60 | 1.23 | 2,620 | 750 |
| 4 (Control) | 60/40 | 0.49 |  |  |
| 4 (Treated) | 60/40 | 0.77 | 2,380 | 650 |

These data show the marked increase in inherent viscosity after treatment of the block copolymers with liquid epoxidized polybutadiene. The products were gel free indicating that chain branching without cross-linking had occurred. The treated polymers that contained more than 10 parts styrene had excellent green tensile and elongation properties.

Example V

The following recipe was employed for the polymerization of butadiene:

| | |
|---|---|
| 1,3-butadiene, parts by weight | 100 |
| Cyclohexane, parts by weight | 1000 |
| n-Butyllithium, mhm. | 1.1 |
| Temperature, °F. | 122 |
| Time, hours | 3 |
| Conversion, percent | 100 |

The polymerization procedure was the same as used in the preceding examples with the solvent being charged first and then the butadiene and butyllithium.

Several runs were made using various treating agents. One run was terminated with isopropyl alcohol and used as a control. Each of the other runs was treated with a different treating agent using one equivalent, based on the initiator. Treatment was effected at 122° F. for 30 minutes to an hour while the reactants were agitated. All polymers were coagulated with isopropyl alcohol, separated, antioxidant was added as in Example I, and the products were dried. All products were gel free. The following table shows the various treating agents and results of inherent viscosity, Mooney, and cold flow determinations on each of the products:

| Run No. | Treating Agent | | | Inh. visc. | ML-4 at 212° F. | Cold Flow, mg./min. |
|---|---|---|---|---|---|---|
| | Type | Equiv. wt. | G./100 g. monomer | | | |
| 1 | HMAT [1] | 79.1 | 0.09 | 2.36 | 57 | 3.6 |
| 2 | SMA 1000 [2] | 202 | 0.2 | 2.17 | 34 | 5.9 |
| 3 | PMDA [3] | 65.5 | 0.07 | 2.26 | 42 | 4.1 |
| 4 | PAPI-1 [4] | 138 | 0.14 | 2.60 | 86 | 0 |
| 5 | Oxiron 2001 [5] | 145 | 0.16 | 2.80 | 81 | 0 |
| 6 | Isopropyl alc. (control) | | | 1.69 | 13 | 29.9 |

[1] Hexa-(2-methyl-1-aziridinyl)triphosphatriazine.
[2] Styrene-maleic anhydride copolymer with 8 repeating units of styrene and maleic anhydride.
[3] Pyromellitic dianhydride.
[4] Polyaryl polyisocyanate.
[5] Liquid epoxidized polybutadiene with a light yellow color, viscosity of 160 poises at 25° C., specific gravity of 1.014, epoxy content of 11.0 percent (oxirane oxygen), and an epoxy equivalent (number of grams of resin containing 1 gram mole of epoxide) of 145. It is a low viscosity version of Oxiron 2000.

The data show that only a very small amount of treating agent gave a pronounced increase in inherent viscosity and Mooney and a drastic reduction in cold flow.

Example VI

Butadiene was polymerized in the manner described in Example V except that the initiator level was 1.4 mhm. Quantitative conversion was reached in 3 hours. One run was terminated with isopropyl alcohol and used as a control as in the preceding example. Two other runs were made. One was terminated with PAPI-1 and the other with Oxiron 2001. One equivalent of each treating agent, based on the initiator, was used. The products were recovered as described in Example V. All were gel free. Results of inherent viscosity, Mooney, and cold flow determinations are shown in the following table:

As can be seen from the data, the control polymer was very soft (low Mooney) and had a high cold flow. Treatment with a very small amount of either polyfunctional compound resulted in products which had very little cold flow, a seven- or eight-fold increase in Mooney, and a pronounced increase in inherent viscosity.

Example VII

Butadiene was polymerized using the following recipe:

| | |
|---|---|
| 1,3-butadiene, parts by weight | 100 |
| Cyclohexane, parts by weight | 1000 |
| n-Butyllithium, mhm. | 2.0 |
| Temperature, °F. | 122 |
| Time, hours | 4 |
| Conversion, percent | 100 |

The run was terminated with PAPI-1 using one equivalent, based on the initiator (2.0 milliequivalents or 0.28 gram per 100 grams monomer). The terminating agent was added and the temperature maintained at 122° F. for one hour while agitating the mixture. The polymer was recovered by coagulation with isopropyl alcohol as in the preceding examples. Properties of the product were as follows:

| | |
|---|---|
| Inherent viscosity | 1.84 |
| Gel, percent | 0 |
| ML-4 at 212° F. | 35 |
| Cold flow, mg./min. | 1.2 |

The treated polymer and the commercial polybutadiene described in Example II (ML-4 at 212° F., 35; cold flow, mg./min. 10.0) were compounded using the recipe of Example II. Processing properties are presented in the following table:

PROCESSING PROPERTIES

| | Treated | Commercial |
|---|---|---|
| MS-1½ at 212° F. | 34.6 | 43.8 |
| Extrusion at 250° F.: | | |
| Inches/min | 50.5 | 57.0 |
| Grams/min | 80.5 | 98.5 |
| Rating (Garvey Die) | 12 | 7 |

| Run No. | Treating Agent | | | Inh. visc. | ML-4 at 212° F. | Cold Flow, mg./min. |
|---|---|---|---|---|---|---|
| | Type | Equiv. wt. | G./100 g. monomer | | | |
| 1 | PAPI-1 | 138 | 0.19 | 2.04 | 47 | 1.3 |
| 2 | Oxiron 2001 | 145 | 0.20 | 2.09 | 37 | 1.2 |
| 3 | Isopropyl alc. (control) | | | 1.31 | 5 | 127.4 |

These data show that the polymers treated with the polyisocyanate had very little, if any, cold flow, and better extrusion appearance (Garvey Die rating) than the control. After curing for 30 minutes at 307° F. both polymer compositions exhibited good physical properties. The treated polymer showed better heat build-up and resilience than the commercial polymer after oven aging 24 hours at 212° F.

*Example VIII*

Two cis-polybutadienes were prepared by the polymerization of butadiene in the presence of an initiator system comprising triisobutylaluminum, titanium tetrachloride, and iodine using toluene as the diluent. Two butadiene polymers were prepared using butyllithium and treating the polymers with a polyfunctional reagent, one with PAPI-1 and the other with Oxiron 2000. The recipes for preparation of the butyllithium polymers were as follows:

POLYMERIZATION RECIPES

|  | BuLi Polymer A | BuLi Polymer B |
|---|---|---|
| 1,3-butadiene, parts by weight | 100 | 100 |
| Cyclohexane, parts by weight | 780 | 780 |
| n-Butyllithium, mhm | 1.4 | 1.4 |
| Temperature, °F | 122 | 122 |
| Time, hours | 3 | 4 |
| Conversion, percent | 85 | 100 |

TREATMENT WITH TERMINATING AGENTS

|  |  |  |
|---|---|---|
| PAPI-1 [1] (equiv. wt. 138): | | |
| Milliequivalents/100 g. monomer | 1.4 | |
| Grams/100 g. monomer | 0.19 | |
| Oxiron 2000 [2] (equiv. wt., 177): | | |
| Milliequivalents/100 g. monomer | | 1.13 |
| Grams/100 g. polymer | | 0.2 |

[1] Five minutes treating time at 122° F.
[2] Fifteen minutes treating time at 122° F.

Two evaluation samples were prepared by solution blending the cis-polybutadienes with the butyllithium polybutadienes. Each composition was a 50/50 weight blend of the two types of polymers. The compositions were recovered by coagulation with isopropyl alcohol, separated, and dried as in the preceding examples. Properties of each of the polymers and the blends are shown in the following tables:

|  | Cis-PBD A | BuLi Polymer A | Blend A |
|---|---|---|---|
| Inherent viscosity | 2.44 | 2.15 | 2.41 |
| Gel, percent | 0 | 0 | 0 |
| ML-4 at 212° F | 39 | 59 | 43 |
| Cold flow, mg./min | 10 | 0 | 2.4 |
| Microstructure, percent: | | | |
| Vinyl | 3.1 | 6.9 | 5.0 |
| Cis | 95.4 | 45.3 | 69.1 |
| Trans | 1.5 | 48.8 | 26.9 |
|  | Cis-PBD B | BuLi Polymer B | Blend B |
| nherent viscosity | 2.54 | 2.15 | 2.47 |
| Gel, percent | 0 | 0 | 0 |
| ML-4 at 212° F | 47 | 49 | 49 |
| Cold flow, mg./min | 5.7 | 0.4 | 1.8 |
| Microstructure, percent: | | | |
| Vinyl | 3.1 | 7.0 | 4.9 |
| Cis | 94.9 | 41.8 | 68.0 |
| Trans | 3.1 | 51.2 | 27.1 |

Polymer blends A and B and the cis-polybutadiene were compounded using the receipe of Example II except that 1.05 parts of NOBS Special was used instead of 1.1 parts. One blend exhibited processing characteristics and vulcanized physical properties substantially the same as the cis-polybutadienes alone. The cold flow of the blends, however, was much lower than what would be expected for a 50/50 mixture of the polymers.

*Example IX*

Two radial polybutadiene polymers were prepared using 100 parts by weight butadiene in 1000 parts cyclohexane and butyllithium as the initiator. In the first run the initiator level was 1.9 millimoles and in the second, 2.8. Polymerization temperature in each case was 122° F. and the time was 4 hours.

Both runs were then treated with methyl-trichlorosilane at the polymerization temperature. In the first run the amount of treating agent was 1.3 milliequivalents (0.43 millimole or 0.065 part) while in the second run the charge was 2.2 milliequivalents (0.73 millimole or 0.11 parts). These units are based on 100 parts of monomer. After 60 hours a polymer having a Mooney value (ML-4 at 212° F.) of 49.6 was recovered from the first run and after 16 hours of the second run a polymer having 25 Mooney was recovered. These polymers were blended in a 50/50 mixture of their solutions in toluene to produce a polymer having a Mooney value of 38.

In the following data the above radial polymer is compared with a linear polybutadiene prepared with butyllithium as the polymerization initiator but not treated with a polyfunctional coupling agent. Also a commercial organolithium initiated polybutadiene is shown for comparison.

All three polymers were compounded using the recipe of Example II.

|  | Radial Polybutadiene | Linear Polybutadiene | Commerical Polybutadiene |
|---|---|---|---|
| Raw Mooney (ML-4 at 212° F.) | 38.0 | 31.5 | 35 |
| Cold flow, glass plate method | 2.35 | 6.20 | 7.66 |
| Cpd. Mooney (MS-1½ at 212° F.) | 32.7 | 32.2 | 40.5 |
| Extrusion at 250° F.: | | | |
| In./min | 75.5 | 63 | 53 |
| G./min | 114 | 137 | 89 |
| Rating (Garvey) | 12 | 10 | 7+ |

All three polymers were cured for 30 minutes at 307° F. and were found to have good and substantially equivalent physical properties. The above data shows that the radial polymer was far superior to the other two in cold flow resistance and extrudability.

*Example X*

Copolymers of 1,3-butadiene and styrenes were prepared using the following recipe:

| | Parts by weight |
|---|---|
| Butadiene | 75 |
| Styrene | 25 |
| Cyclohexane | 1000 |
| Tetrahydrofuran | 1.5 |
| n-Butyllithium | variable |
| Conversion, percent | 100 |
| Time, hours | 3 |
| Temperature, °F. | 122 |

The tetrahydrofuran was added to induce random copolymerization. On completion of the polymerization a treating agent was added and the reaction mixtures were held at 122° F. for 2 more hours. In one series of runs the polymerizations were terminated and the polymers recovered by adding an excess of isopropyl alcohol without use of a polyfunctional treating agent. In the runs employing a treating agent the polymers were subsequently recovered by coagulation with alcohol as described in the preceding examples. The initiator levels, treating agents and polymer properties are shown in the following table:

| Run No. | Initiator Level (mhm.) | Treating Type | Agent amt. (mem)[1] | Inh. Visc.[2] | Mooney (ML-4 at 212° F.) | Cold Flow (mg./min.) |
|---|---|---|---|---|---|---|
| 1 | 1.1 | None | | 2.23 | 110 | 2.2 |
| 2 | 1.2 | ...do... | | 1.75 | 52 | 6.1 |
| 3 | 1.3 | Oxiron 2000 | 0.8 | 2.59 | 95 | 0 |
| 4 | 1.3 | SiCl₄ | 0.8 | 2.16 | 94 | 0 |
| 5 | 1.4 | None | | 1.58 | 32 | 9.4 |
| 6 | 1.4 | Oxiron 2000 | 0.9 | 2.81 | 68 | 0 |
| 7 | 1.4 | SiCl₄ | 0.9 | 2.22 | 98 | 0 |
| 8 | 1.5 | None | | 1.30 | 14 | 21.5 |
| 9 | 1.5 | Oxiron 2000 | 1.0 | 2.11 | 59 | 0 |
| 10 | 1.5 | SiCl₄ | 1.0 | 1.97 | 70 | 0 |
| 11 | 1.6 | None | | 1.13 | 9 | 19.8 |
| 12 | 1.6 | Oxiron 2000 | 1.1 | 1.86 | 45 | 0 |
| 13 | 1.6 | SiCl₄ | 1.1 | 1.77 | 56 | 0 |
| 14 | 1.8 | None | | 1.06 | 6 | 22.6 |
| 15 | 1.8 | Oxiron 2000 | 1.3 | 1.76 | 40 | 0.4 |
| 16 | 1.8 | SiCl₄ | 1.3 | 1.83 | 54 | 0.5 |
| 17 | 1.9 | Oxiron 2000 | 1.4 | 1.71 | 39 | 0.9 |
| 18 | 1.9 | SiCl₄ | 1.4 | 1.66 | 45 | 0.3 |
| 19 | 2.0 | Oxiron 2000 | 1.5 | 1.57 | 30 | 1.4 |
| 20 | 2.0 | SiCl₄ | 1.5 | 1.66 | 39 | 0.3 |

[1] Milliequivalents per 100 parts of monomer.
[2] All polymers were gel free.

The above data show how polymers of various viscosities can be prepared by selection of initiator level and treating agent without the problem of cold flow. Run 1 shows that without the treating agent the problem of cold flow exists even in the polymers of very high viscosity. On the other hand, low Mooney rubber can be made with substantially less cold flow by using higher initiator levels and a polyfunctional treating agent (Runs 15–20). Runs 2, 5, 8, 11 and 14 show that attempts to produce lower Mooney polymers without the treating agent increased the tendency of the product to cold flow.

In the above data standard rubber testing procedures were used to determine processing and physical properties. Mooney viscosities were determined by the Method ASTM D–927–57T. Inherent viscosity was determined by placing 0.1 gram of polymer in a wire cage in 100 milliliters of toluene and allowing the polymer to stand at about 25° C. for 24 hours. The cage was then removed and the solution filtered. The solution was then passed through a Medallia-type viscometer at 25° C., the viscometer having been calibrated with toluene. Inherent viscosity is calculated by dividing the natural logarithm of the relative viscosity by the weight of the original sample. The relative viscosity is the ratio of the viscosity of the polymer solution to that of toluene.

Cold flow, unless otherwise indicated, was measured by extruding the polymer through a ¼ inch orifice at 3.5 p.s.i. pressure and a temperature of 122° F. After allowing 10 minutes to reach steady state, the rate of extrusion was measured and the values recorded in milligrams per minute. In the glass plate method of determining cold flow, four cylinders, 0.450 x 0.450 inch, were cut from a compression molded slab or rubber and placed erect between two 3 x 4 inch glass plates averaging 26–27 grams in weight. The cylinders were positioned at the corners of a 1.5 x 2 inch rectangle in the center of the plates and the sandwich thus assembled was weighted with a 3 x 4 inch lead plate weighing 160 grams. After standing 18 hours at 80° F. the weight was removed and the increased area of contact between the cylinders and the top plate was measured. The cold flow recorded is the ratio of the final to the initial area of contact between the rubber cylinders and glass plate.

As will be apparent to those skilled in the art, from the above discussion, various modifications can be made in our invention without departing from the spirit or scope thereof.

We claim:

1. A method of making a branched polymer which comprises polymerizing monomers selected from the group consisting of conjugated dienes and vinyl-substituted aromatic compounds in the presence of an organomonolithium initiator and reacting the resulting mono-lithium-terminated polymer with from 0.1 to about 1 equivalent based on the lithium in the polymer of a compound having at least three reactive sites capable of reacting with the carbon-lithium bond of the polymer, exclusive of organic reactant materials having halogen atoms that are attached to a carbon atom which is alpha to an activating group selected from the group consisting of an ether linkage, a carbonyl and a carbon-to-carbon double bond, thereby coupling said polymer with said compound.

2. A method of making a branched polymer which comprises polymerizing a conjugated diene having 4 to 8 carbon atoms per molecule in the presence of an organo-monolithium initiator, and reacting the resulting mono-lithium-terminated polymer with from 0.1 to about 1 equivalent based on the lithium in the polymer of a compound having at least three reactive sites capable of reacting with the carbon-lithium bond of the polymer, exclusive of organic reactant materials having halogen atoms that are attached to a carbon atom which is alpha to an activating group selected from the group consisting of an ether linkage, a carbonyl and a carbon-to-carbon double bond, thereby coupling said polymer to said compound.

3. A method of making a branched conjugated diene polymer which comprises polymerizing a conjugated diene having 4 to 8 carbon atoms per molecule in the presence of an organo-monolithium initiator and reacting the resulting mono-lithium-terminated polymer with from 0.5 to about 1 equivalent based on the lithium in the polymer of a polyepoxide compound, said polyepoxide compound having at least 3 reactive sites capable of reacting with the carbon-lithium bond of the polymer and having sufficient epoxy groups to characterize said compound substantially as a polyepoxide, said compound functioning to yield said branched conjugated diene polymer.

4. A method of making a branched conjugated diene polymer which comprises polymerizing a conjugated diene having 4 to 8 carbon atoms per molecule in the presence of an organo-monolithium initiator and reacting the resulting mono-lithium-terminated polymer with from 0.5 to about 1 equivalent based on the lithium in the polymer of a polyisocyanate compound, said polyisocyanate compound having at least 3 reactive sites capable of reacting with the carbon-lithium bond of the polymer and having sufficient isocyanate groups to characterize said compound substantially as a polyisocyanate, said compound functioning to yield said branched conjugated diene polymer.

5. A method of making a branched conjugated diene polymer which comprises polymerizing a conjugated diene having 4 to 8 carbon atoms per molecule in the presence of an organo-monolithium initiator and reacting the resulting mono-lithium-terminated polymer with from 0.5 to about 1 equivalent based on the lithium in the polymer of a polyimine compound, said polyimine compound having at least 3 reactive sites capable of reacting with the carbon-lithium bond of the polymer and having sufficient imine groups to characterize said compound substantially as a polyimine, said compound functioning to yield said branched conjugated diene polymer.

6. A method of making a branched conjugated diene polymer which comprises polymerizing a conjugated diene having 4 to 8 carbon atoms per molecule in the presence of an organo-monolithium initiator and reacting the resulting mono-lithium-terminated polymer with from 0.5 to about 1 equivalent based on the lithium in the polymer of a polyaldehyde compound, said polyaldehyde compound having at least 3 reactive sites capable of reacting with the carbon-lithium bond of the polymer and having sufficient aldehyde groups to characterize said compound substantially as a polyaldehyde, said compound functioning to yield said branched conjugated diene polymer.

7. A method of making a branched conjugated diene polymer which comprises polymerizing a conjugated diene having 4 to 8 carbon atoms per molecule in the presence of an organo-monolithium initiator and reacting the resulting mono-lithium-terminated polymer with from 0.5 to about 1 equivalent based on the lithium in the polymer of a polyketone compound, said polyketone compound having at least 3 reactive sites capable of reacting with the carbon-lithium bond of the polymer and having sufficient ketone groups to characterize said compound substantially as a polyketone, said compound functioning to yield said branched conjugated diene polymer.

8. A method of making a branched conjugated diene polymer which comprises polymerizing a conjugated diene having 4 to 8 carbon atoms per molecule in the presence of an organo-monolithium initiator and reacting the resulting mono-lithium-terminated polymer with from 0.5 to about 1 equivalent based on the lithium in the polymer of a polyanhydride compound, said polyanhydride compound having at least 3 reactive sites capable of reacting with the carbon-lithium bond of the polymer and having sufficient anhydride groups to characterize said compound substantially as a polyanhydride, said compound functioning to yield said branched conjugated diene polymer.

9. A method of making a branched conjugated diene polymer which comprises polymerizing a conjugated diene having 4 to 8 carbon atoms per molecule in the presence of an organo-monolithium initiator and reacting the resulting mono-lithium-terminated polymer with from 0.5 to about 1 equivalent based on the lithium in the polymer of a polyester compound, said polyester compound having at least 3 reactive sites capable of reacting with the carbon-lithium bond of the polymer and having sufficient ester groups to characterize said compound substantially as a polyester, said compound functioning to yield said branched conjugated diene polymer.

10. A method of making a branched conjugated diene polymer which comprises polymerizing a conjugated diene having 4 to 8 carbon atoms per molecule in the presence of an organo-monolithium initiator and reacting the resulting mono-lithium-terminated polymer with from 0.5 to about 1 equivalent of a polyhalide based on the lithium in the polymer, said polyhalide being exclusive of organic reactant materials containing halogen atoms that are attached to a carbon atom which is alpha to an activating group selected from the group consisting of an ether linkage, a carbonyl and a carbon-to-carbon double bond said polyhalide compound having at least 3 reactive sites capable of reacting with the carbon-lithium bond of the polymer and having sufficient halide groups to characterize said compound substantially as a polyhalide, said compound functioning to yield said branched conjugated diene polymer.

11. A method of making a branched polymer which comprises polymerizing butadiene in the presence of n-butyllithium and reacting the resulting mono-lithium terminated polymer with about 1 equivalent based on the lithium in the polymer of liquid epoxidized polybutadiene.

12. A method of making a branched polymer which comprises copolymerizing butadiene and styrene in the presence of n-butyllithium and reacting the resulting mono-lithium terminating polymer with at least 0.1 to about 1 equivalent based on the lithium in the polymer of hexa(2-methyl-1-aziridinyl)-triphosphatriazine.

13. A method of making a branched polymer which comprises polymerizing isoprene in the presene of n-butyllithium and reacting the resulting mono-lithium terminated polymer with about 1 equivalent based on the lithium in the polymer of styrene-maleic anhydride copolymer.

14. A method of making a branched polymer which comprises polymerizing butadiene in the presence of n-butyllithium and reacting the resulting mono-lithium terminated polymer with about 1 equivalent based on the lithium in the polymer of pyromelliticdianhydride.

15. A method of making a branched polymer which comprises polymerizing butadiene in the presence of n-butyllithium and reacting the resulting mono-lithium terminated polymer with about 1 equivalent based on the lithium in the polymer of polyaryl polyisocyanate.

16. The process of claim 2 wherein the reaction is carried out in excess of 100° F.

17. The branched polymer prepared by the method of claim 1.

18. The branched polymer prepared by the method of claim 11.

19. The branched polymer prepared by the method of claim 10.

References Cited by the Examiner

UNITED STATES PATENTS

| | | | |
|---|---|---|---|
| 3,055,952 | 9/1962 | Goldberg | 260—94.7 |
| 3,078,254 | 2/1963 | Zelinski et al. | 260—94.7 |
| 3,135,716 | 6/1964 | Uraneck et al. | 260—93.5 |

LEON J. BERCOVITZ, *Primary Examiner.*

DONALD E. CZAJA, *Examiner.*

R. A. WHITE, *Assistant Examiner.*